No. 860,872. PATENTED JULY 23, 1907.
J. W. JOHNSON.
WOODWORKING MACHINE.
APPLICATION FILED MAY 29, 1906.
3 SHEETS—SHEET 1.
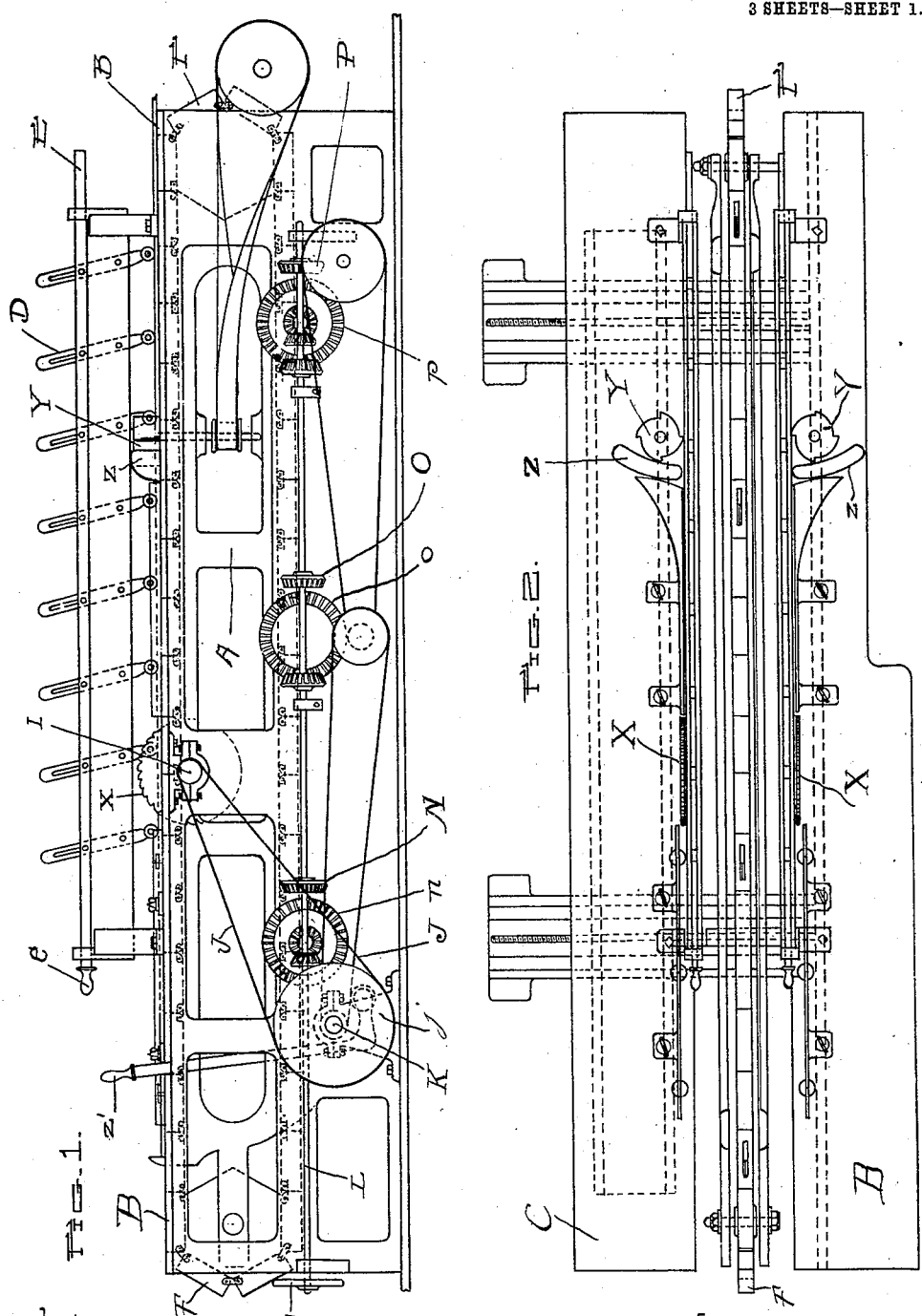

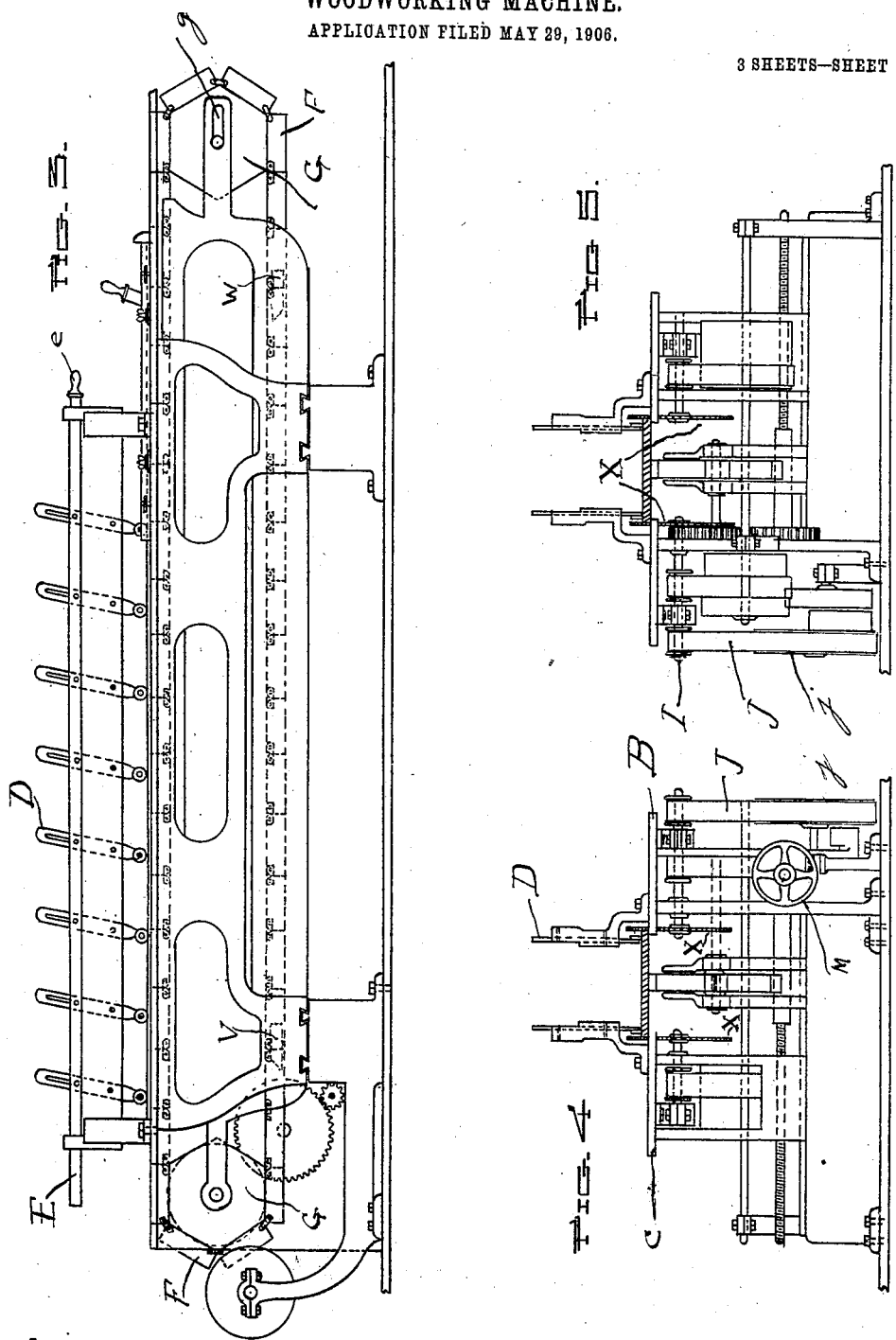

No. 860,872. PATENTED JULY 23, 1907.
J. W. JOHNSON.
WOODWORKING MACHINE.
APPLICATION FILED MAY 29, 1906.
3 SHEETS—SHEET 3.
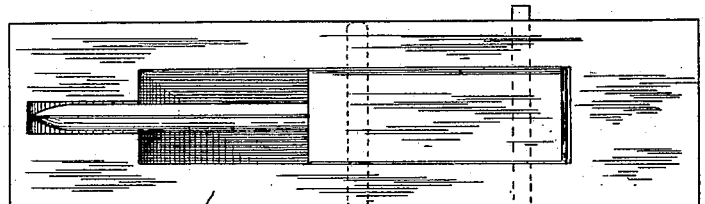
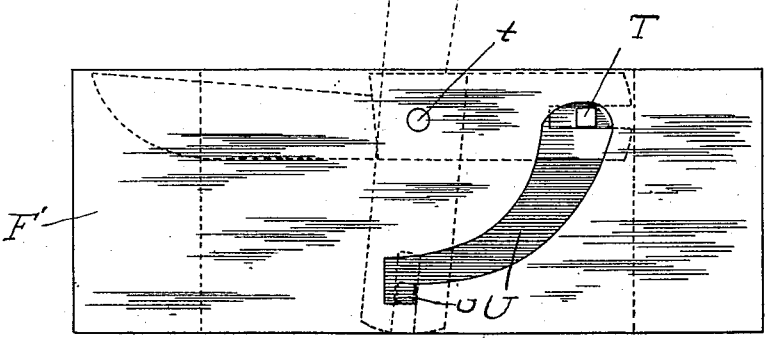
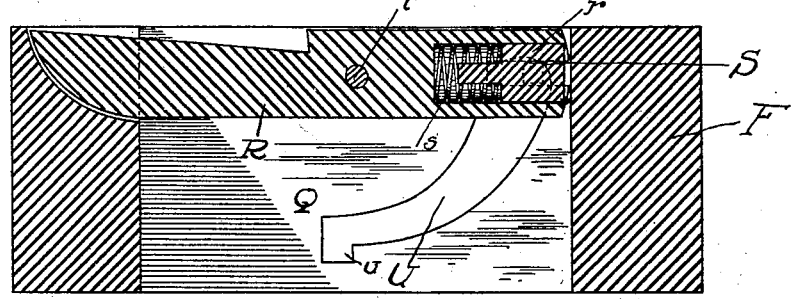
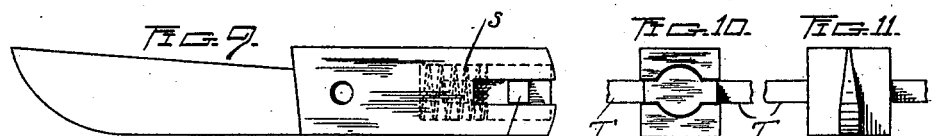
Witnesses:
Inventor:
John W. Johnson.
By his Atty. 

UNITED STATES PATENT OFFICE.

JOHN W. JOHNSON, OF LEOMINSTER, MASSACHUSETTS.

WOODWORKING-MACHINE.

No. 860,872.  Specification of Letters Patent.  Patented July 23, 1907.

Application filed May 29, 1906. Serial No. 319,235.

*To all whom it may concern:*

Be it known that I, JOHN W. JOHNSON, of Leominster, in the county of Worcester and State of Massachusetts, have invented new and useful Improvements in Woodworking-Machines; and I do hereby declare that the following is a full, clear, and exact description of the same.

This invention relates to wood working machines and particularly to edge trimming and finishing machines.

An object of this invention is to provide novel means for engaging and feeding the material to the saws and finishing knives, and for releasing the said material; furthermore, an object of the invention is to provide a suitable table made up of longitudinally disposed sections; one of said sections being stationary and the other section being adjustable with relation to the stationary section; said adjustment serving to vary the width of the table.

A still further object of the invention is to provide clamping or guiding devices for each section of the table, the said clamping or guiding devices extending longitudinally of the table and having connections whereby the clamping or guiding devices are operated from the ends of the table or intermediately thereof.

It is furthermore, an object of the invention to provide novel means permitting the manipulation of the movable sections of the table with relation to the stationary section thereof, whereby the power is applied near the two ends of the table in order that the table may be held parallel.

Finally an object of this invention is to produce a device of the character described, possessing advantages in points of simplicity, efficiency and durability, proving at the same time comparatively inexpensive to produce and maintain.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a view in side elevation of a wood working machine embodying the invention. Fig. 2, is a plan view thereof. Fig. 3, illustrates a side elevation opposite to that shown in Fig. 1. Figs. 4 and 5, are views in elevation showing opposite ends of the machine. Fig. 6, is a plan view of one of the links containing the engaging device for feeding the material. Fig. 7, illustrates a side elevation thereof. Fig. 8, is a longitudinal vertical section view thereof. Figs. 9, 10 and 11, are detail views of the interior mechanism of said links.

In these drawings A, indicates the frame of the machine consisting of a bed plate and suitable uprights to support the stationary table B, and the mechanism for actuating the movable section C, of the table.

Each section of the table is provided with a series of arms D, pivotally connected to the upper surfaces of the table near the inner edges and said arms are pivotally connected through the medium of a reciprocating bar E, it being understood that one such bar E, is provided with each series of arms. The bar terminates in a handle e, by which it is manipulated although it will be understood that the movement of any one of the arms will communicate motion to the bar and to the other arms of the series. The arms act as guides and means for engaging the material being fed through the machine, in order that it may be properly presented to the saws and planers.

Intermediately the movable and stationary sections of the bed I provide a link chain made up of a series of links F, suitably hinged together and at suitable intervals in the chain I provide links having material engaging mechanism (to be hereinafter described) which engage the material and force it into operative relation with the saws and planers. The chain is run over a polygonal drum or wheel G, at each end of the table and one of said drums is provided with a slot $g$, by which it is adjusted on its shaft H, in order to take up any slack in the chain. The tables are provided with transverse shaft studs I, arranged in alinement each of which being provided with a saw. The saws to rotate in unison in order that any material fed between said saws will be cut to a width equal to the distance between said saws. The stubs I, are driven by a suitable belt and pulley J and $j$, respectively, and the said pulley $j$, is mounted on a shaft K, driven from any suitable source of power. The main shaft K, is belted up with other parts of the machine in order to drive the several cutters and feeding mechanism.

Extending longitudinally of the stationary section of the frame is the shaft L, having a hand wheel M, on one end by which it is rotated and said shaft carries a series of sets of beveled gear-wheels N, O, and P, the said sets being adapted to mesh with the beveled gear wheels $n$, $o$, and $p$, on the transversely disposed screws N′, O′, and P′. which rotate in suitable bearings on the stationary section and operate through suitable threaded apertures in the movable section for the purpose of adjusting the movable section with relation to the stationary section. The longitudinally disposed shaft L, is slidable in its bearings and the operator may cause either of the gear wheels of each set N, O, and P, to mesh with its respective bevel gear wheel, $n$, $o$, $p$.

The feeding mechanism comprises the chain as heretofore stated, with certain links thereof containing the feeding mechanism as follows. The link F′ has a recess Q, in which a blade R, is pivoted, the said blade having a shank $r$, recessed to form a socket for the reception of the follower S, said follower being held normally projected through the medium of the spring s, which bears against the inner end of the said follower. A cross pin T, is carried by the follower and projects through a slot in the body of the link, and said cross pin rides in the slot as the blade is swung on its pivot t. The slot U, terminates at its inner end in a notch u, which forms a seat into which the cross pin is forced when the shank of the blade has been forced to the limit of its movement and said blade is held in the open position indicated by dotted lines in Fig. 7, by reason of the cross pin lying in the notch u, until the link has traveled into engagement with the tripping mechanism V, stationed at one end of the frame, by which tripping mechanism, the blade is returned to its closed position shown in Fig. 8.

In view of the fact that the finished material will pile up beneath the machine, it has been found essential that the blades should fold as otherwise this piled finished material would interfere with the operation of the conveyer.

The blade is opened to its operative position through the engagement of the contact W, located at the front end of the machine. As the several links travel around the drums or pulleys the material is fed to the front end of the machine and being engaged by the said blades, is carried between the saws X, and toward the rear of the machine, where the material comes into the field of operation of the planers or finishing knives Y, and the edges of the said material are trimmed and finished ready for use. The table is provided with two deflectors Z, just in front of the planers to deflect the sawdust or cuttings.

The pulleys and shafting are under the control of the operating handle Z', so that the parts may be under the control of the operator stationed at that point.

Having fully described my invention what I claim as new and desire to secure by Letters Patent, is—

1. In a working conveyer, a series of links, certain of said links having recesses, blades pivoted in the recesses, shanks for the blades having recessed ends, a spring pressed follower therein, pins carried by the follower, the said links having slotted sides in which the pins slide, the said slots terminating in notches adapted to receive the pins to hold the blade in operative position.

2. In a wood working conveyer, a series of links, means for connecting the links together, certain of said links having recesses, the walls of said recesses being slotted, blades pivoted in the recesses, shanks for the blades, having recessed ends, a spring pressed follower within the recesses of the blades, cross pins carried by the follower, the said slots of the recessed links terminating in notches adapted to receive the cross pins.

3. In combination with a frame, a wood working conveyer thereon, comprising the series of links hinged one to the other, certain of said links having recesses, blades pivoted in the recesses, followers carried by the blades, cross pins carried by the follower, said recessed links having slots in the sides of said recesses engaged by the cross pins.

JOHN W. JOHNSON.

Witnesses:
O. A. TAFT,
K. S. TAFT.